United States Patent Office 3,130,213
Patented Apr. 21, 1964

3,130,213
HYDROCARBYLTHIO MANGANESE TRICARBONYLS
Robert J. Harper, Baton Rouge, La., assignor to Ethyl Corporation, New York, N.Y., a corporation of Virginia
No Drawing. Filed Aug. 1, 1960, Ser. No. 46,363
9 Claims. (Cl. 260—429)

This invention relates to and has as its principal object the provision of novel mercaptomanganese carbonyl compounds and methods for their preparation.

Provided by this invention are mercaptomanganese tricarbonyls; i.e. organic thiomanganese tricarbonyl compounds in which the organic group—preferably an alkyl, aralkyl, aryl or alkaryl group of up to about 10 carbon atoms—is linked to a sulphur atom which in turn is bonded to a manganese atom carrying 3 carbonyl groups. The experimental evidence indicates that the compounds of this invention tend to exist under most conditions as trimers and under some conditions as dimers. However, this is of theoretical or academic interest only since the compounds of this invention, whether they be dimers or trimers, are of value in the chemical and allied arts and this usefulness is independent of the precise form in which these compounds exist. Accordingly, it is not intended that this invention be limited to any particular structural criteria insofar as the polymeric nature of the compounds is concerned.

The compounds of this invention described hereinafter were found to be dark yellow or orange colored solids having good thermal stability. By way of example, they were found to resist thermal decomposition until temperatures in the range of 200° to 225° C. were reached. The melting points of the purified compounds generally fell within the same temperature range. These mercaptomanganese tricarbonyls are soluble in various hydrocarbons such as gasolines, petroleum ether, and other hydrocarbon fractions or pure hydrocarbons. When dissolved in low concentrations in gasoline-type fuels and subjected to standard antiknock evaluation tests the compounds of this invention were found to possess octane-improving properties.

It appears that prior to this invention no published work was extant on any kind of manganese sulphur carbonyl compounds.

A good method for the preparation of the compounds of this invention involves reacting manganese pentacarbonyl dimer (i.e. dimanganese decacarbonyl) with a mercaptan under the influence of ultraviolet light. This reaction can be carried out at ordinary temperatures while irradiating the reactancts with light in the ultraviolet region. A solvent is unnecessary, particularly where the mercaptan is itself a liquid at ambient temperatures. Such liquid mercaptans include ethyl mercaptan, butyl mercaptan, isobutyl mercaptan, tert-butyl mercaptan, and phenyl mercaptan. However, it is preferable to employ an inert reaction solvent since this tends to enhance the rate and yield in the reaction. Particularly convenient and useful as solvents in this reaction are the liquid hydrocarbons such as benzene, toluene, xylenes, hexanes, petroleum ether, light naphthas, heptanes, octanes and the like, The proportions of the reactants are not critical. However, it is generally desirable to use an excess of the mercaptan relative to the manganese pentacarbonyl. Such excess generally ranges from about 2 to about 10 moles of mercaptan per mole of the manganese pentacarbonyl dimer.

Room temperature and temperatures slightly above room temperature are the most convenient and efficacious in conducting the process of this invention. However, if desired, the temperature can be in the range of about 0° to 100° C. or higher, dependent, of course, upon the boiling points of the reactants and of the solvent, if one is used.

Another method of preparing the compounds of this invention is to react a halomanganese pentacarbonyl (e.g. chloromanganese pentacarbonyl) with the appropriate mercaptan. The use of an inert organic solvent such as a hydrocarbon of the type described above is desirable. The reaction temperatures are in the order of from about 60° to about 150° C. In this process, no advantage is gained by the use of ultraviolet light irradiation.

This invention will be further understood by reference to the following examples in which all parts and percentages are by weight unless otherwise specified.

EXAMPLE I

Into a reaction vessel were introduced 19.5 parts of manganese pentacarbonyl dimer, 10 parts by volume of ethyl mercaptan and 200 parts by volume of a commercially-available petroleum ether (B.P. 35–39° C.). The system was then exposed to an ultraviolet lamp for a period of 18 hours during which time it was stirred and kept under nitrogen. Then exposure to the ultraviolet light was continued for 5 more hours. Thereupon the reaction mixture was filtered through a short alumina column using a commercially-available hydrocarbon cut (B.P. 65–69° C.) as the added solvent. The eluant was placed in a container maintained under nitrogen and upon completion of the filtration operation, the unreacted ethyl mercaptan and excess solvent were removed by distillation. The solution was then allowed to stand in order for crystallization to occur. The resultant orange and yellowish crystals which were so-obtained were introduced into a sublimation apparatus and heated to approximately 120° C. at 3 mm. of mercury pressure. The unreacted manganese pentacarbonyl dimer (2.1 parts) sublimed leaving behind 2.43 parts of orange, crystalline ethyl thiomanganese tricarbonyl which was thermally stable up to 200° C. Additional workup of the mother liquor produced additional ethyl thiomanganese tricarbonyl product (total yield 13.5 percent). This product was then recrystallized from a fresh portion of the above-described commercially-available hydrocarbon cut and analyzed. Calculated for $C_5H_5MnO_3S$: C=30.0, H=2.52, S=16.0, Mn=27.46. Found: C=30.1, H=2.5, S=15.9, Mn=26.82.

EXAMPLE II

Into a reaction vessel there were introduced 31.2 parts of manganese pentacarbonyl, 20 parts by volume of propyl mercaptan and 200 parts by volume of the hydrocarbon cut described in Example I. The reaction vessel was blanketed under nitrogen and exposed to an ultraviolet sunlamp for 40 hours. Then, solvent and unreacted propyl mercaptan were removed via a stream of nitrogen. The crude reaction product showed a very low melting point. The reaction mixture was then dissolved in a mixture of petroleum ether and the petroleum hydrocarbon cut, put through alumina and the eluting solution concentrated and refluxed. The material which crystallized out was a mixture of product and of unreacted manganese pentacarbonyl. Then the unreacted manganese pentacarbonyl was removed by sublimation. The yield of propyl thiomanganese tricarbonyl was 9.6 parts (28 percent). The material was recrystallized from the above hydrocarbon cut under nitrogen and subjected to analysis. Calculated for $C_6H_7SMnO_3$: C=33.7, H=3.3, S=15.0, Mn=25.7. Found C=33.7, H=3.3, S=14.9, Mn=25.5, 26.3.

EXAMPLE III

Into a reaction vessel there were introduced 39 parts of manganese pentacarbonyl, 20 parts by volume of thiophenol and 200 parts by volume of petroleum ether. The vessel was kept under nitrogen, and the reaction mixture was stirred and exposed to an ultraviolet sunlamp for one day. The reaction mixture was then filtered under nitrogen and the solids were extracted successively with petroleum ether, ether, benzene, and acetone. The petroleum ether and ether were removed, and the residual material dissolved in petroleum ether and put through an alumina column. When the petroleum ether had removed all manganese pentacarbonyl, thiophenol and phenyl disulfide, ether was used to elute the product. A total of orange crystalline solid—viz. phenyl thiomanganese tricarbonyl—was 2.6 parts (5 percent). The final product was recrystallized from the above-referred-to petroleum hydrocarbon cut to give an orange solid M.P. 225° C.

*Analysis.*—Calculated for $C_9H_5SMnO_3$, C=43.5, H=2.0, Mn=22.1, S=12.9; mol wt.=744 (trimer). Found C=43.7, H=2.1, Mn=21.7, 23.1, S=12.3, 13.9, mol wt.=766.

EXAMPLE IV

Into a reaction vessel there were introduced 1 part of bromo manganese pentacarbonyl, 0.4 part by volume of thiophenol and 50 parts by volume of the above petroleum cut. The reaction mixture was refluxed for 1.5 hours under nitrogen, then approximately 20 parts by volume of the solvent was removed by distillation and 20 parts by volume of benzene were added. The reaction mixture was then refluxed for 4 hours. During the course of the reaction increasing amounts of a white solid precipitated in the flask. The reaction mixture was then filtered, the solvents removed and the resultant material put through an alumina column using petroleum ether (B.P. 35–39° C.) as the solvent. The petroleum ether eluant contained phenyl disulfide and manganese pentacarbonyl (identified by infrared). The second fraction (ether-eluant) gave an orange solid, whose infrared spectra indicated it to be phenyl thiomanganese tricarbonyl (yield 0.05 part or 6 percent).

Other examples of the practice of this invention are given in the following table.

It is seen from the above examples that various mercaptomanganese tricarbonyl compounds can be conveniently prepared. Thus, using the techniques described in the above examples manganese pentacarbonyl dimer can be caused to react under the influence of ultraviolet light with such mercaptans as octyl mercaptan, decyl mercaptan, cumenyl mercaptan, cyclohexyl mercaptan, p-tert-butyl phenyl mercaptan and 2-phenylethyl mercaptan to form the following respective compounds: octyl thiomanganese tricarbonyl, decyl thiomanganese tricarbonyl, cumenyl thiomanganese tricarbonyl, cyclohexyl thiomanganese tricarbonyl p-tert-butyl phenyl thiomanganese tricarbonyl and 2-phenylethyl thiomanganese tricarbonyl. These and other compounds in accordance with this invention will now be apparent to one skilled in the art.

I claim:
1. Hydrocarbon thiomanganese tricarbonyls in which the hydrocarbon group contains up to about 10 carbon atoms and is selected from the group consisting of alkyl, aralkyl, aryl and arlkaryl radicals.
2. Alkyl hydrocarbon thiomanganese tricarbonyls in which the alkyl group contains up to about 10 carbon atoms.
3. Ethyl thiomanganese tricarbonyl.
4. Propyl thiomanganese tricarbonyl.
5. Aryl hydrocarbon thiomanganese tricarbonyls in which the aryl group contains up to about 10 carbon atoms.
6. Phenyl thiomanganese tricarbonyl.
7. Tolyl thiomanganese tricarbonyl.
8. Butyl thiomanganese tricarbonyl.
9. Benzyl thiomanganese tricarbonyl.

References Cited in the file of this patent

UNITED STATES PATENTS

| | | |
|---|---|---|
| 2,039,555 | Rosenstein | May 5, 1936 |
| 2,227,547 | Lanzetti | Jan. 7, 1941 |
| 2,818,416 | Brown et al. | Dec. 31, 1957 |
| 2,952,519 | Podall et al. | Sept. 13, 1960 |
| 2,953,587 | Clinton et al. | Sept. 20, 1960 |

FOREIGN PATENTS

| | | |
|---|---|---|
| 782,738 | Great Britain | Sept. 11, 1957 |

*Table.—Compounds of This Invention and Their Preparation*

| Example | Reactants | Solvent | Reaction Conditions | Compounds Formed |
|---|---|---|---|---|
| V | p-Tolyl mercaptan; manganese pentacarbonyl. | Pertroleum ether | Ultraviolet light; 11 hrs. | p-Tolyl thiomanganese tricarbonyl, orange solid, M.P. 218–20° C. |
| VI | Benzyl mercaptan; manganese pentacarbonyl. | do | Ultraviolet light; 24 hrs. | Benzyl thiomanganese tricarbonyl, orange-brown solid. |
| VII | Butyl mercaptan; manganese pentacarbonyl. | do | Ultraviolet light; 20 hrs. | Butyl thiomanganese tricarbonyl, orange solid. |
| VIII | Ethyl thioglycolate; manganese pentacarbonyl dimer. | Benzene | Ultraviolet light; 23 hrs. | Carbethoxymethyl thiomanganese tricarbonyl, orange solid. |

UNITED STATES PATENT OFFICE
CERTIFICATE OF CORRECTION

Patent No. 3,130,213                  April 21, 1964

Robert J. Harper

It is hereby certified that error appears in the above numbered patent requiring correction and that the said Letters Patent should read as corrected below.

Column 3, line 11, for "pu" read -- put --; column 4, line 20, for "arlkaryl" read -- alkaryl --.

Signed and sealed this 3rd day of November 1964.

(SEAL)
Attest:

ERNEST W. SWIDER                      EDWARD J. BRENNER
Attesting Officer                      Commissioner of Patents